Sept. 23, 1941.                J. A. TAGGART                2,256,533
                             MANIFOLDING DEVICE
                             Filed July 10, 1940              4 Sheets-Sheet 1
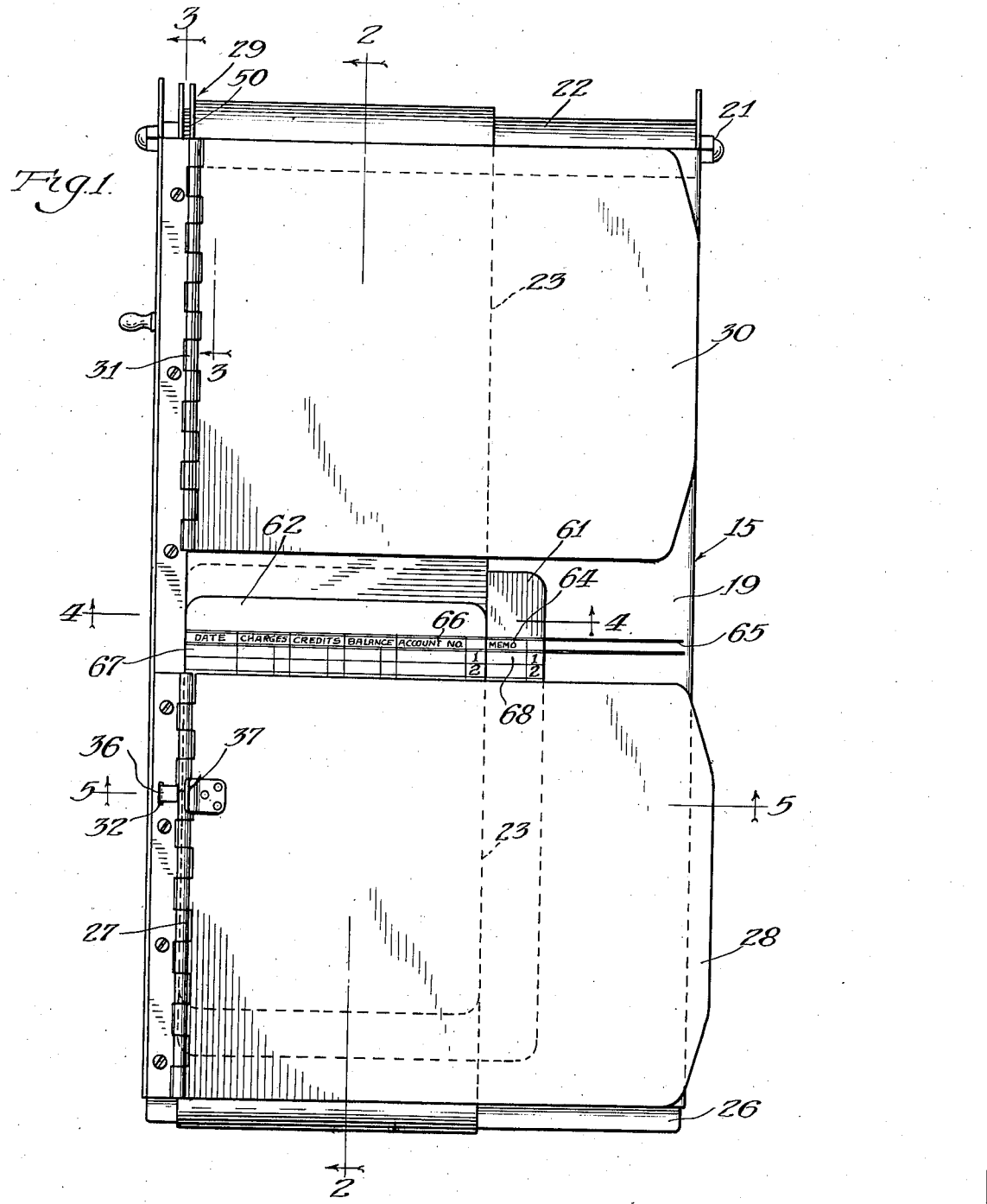
Inventor:
James A. Taggart
By: Wallace & Cannon
His Attorneys Sept. 23, 1941.                    J. A. TAGGART                    2,256,533
                               MANIFOLDING DEVICE
                              Filed July 10, 1940              4 Sheets-Sheet 2
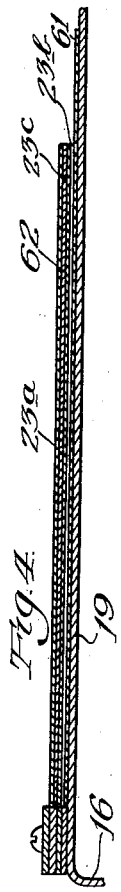
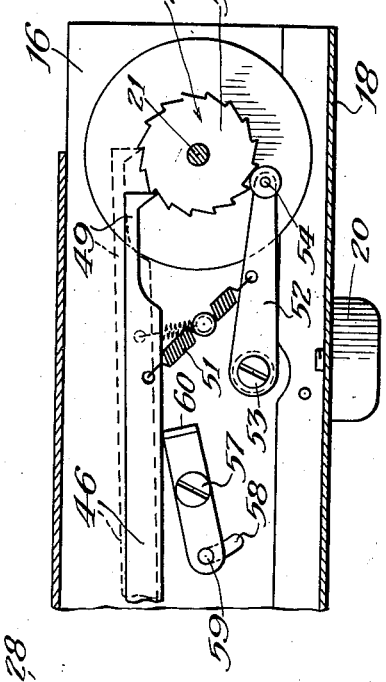
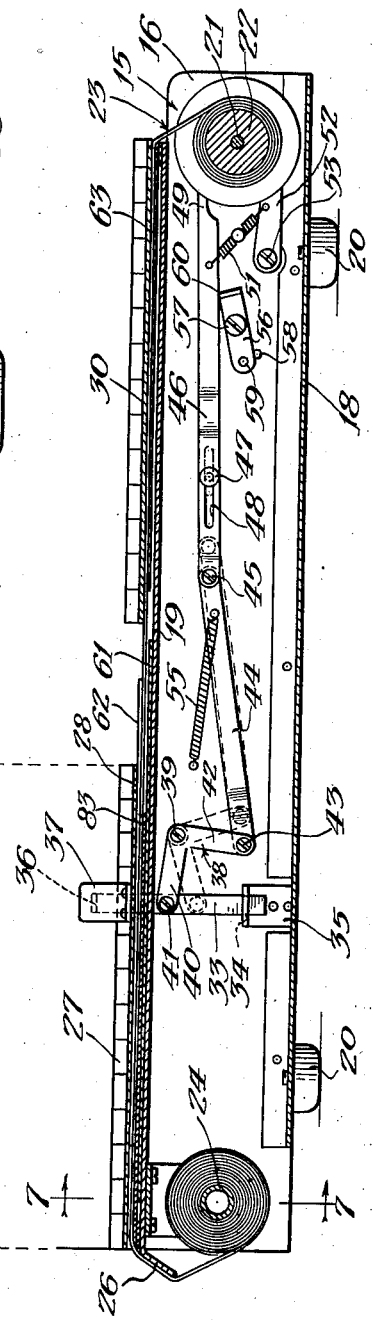
Inventor:
James A. Taggart
By: Wallace and Cannon
His Attorneys Sept. 23, 1941.                J. A. TAGGART                  2,256,533
                            MANIFOLDING DEVICE
                         Filed July 10, 1940           4 Sheets-Sheet 3
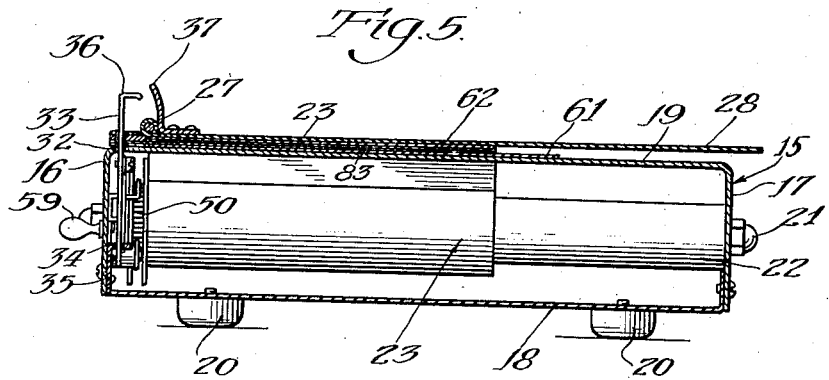
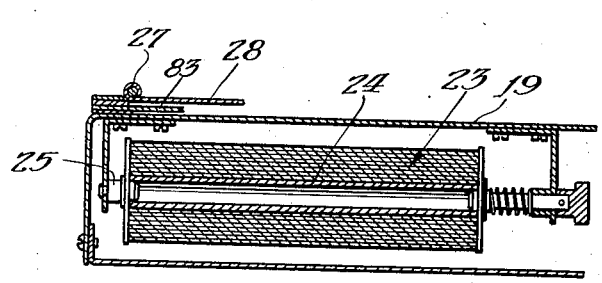
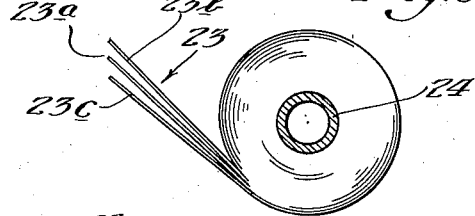
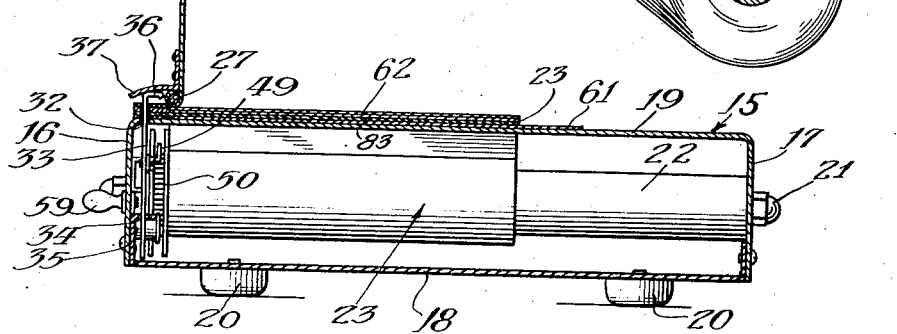
Inventor:
By James A. Taggart,
Wallace and Cannon,
His Attorneys.

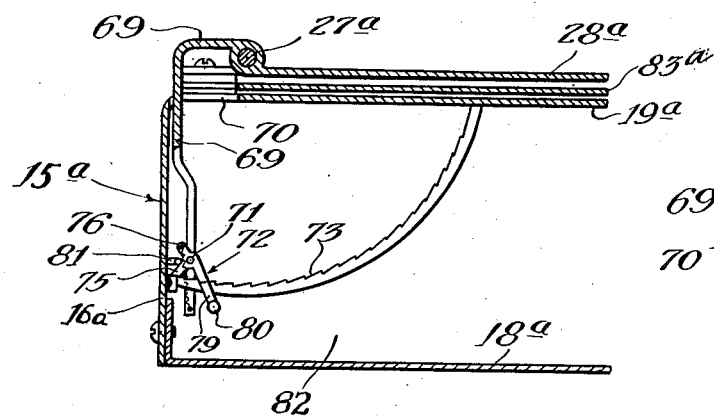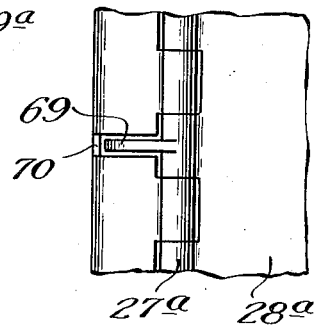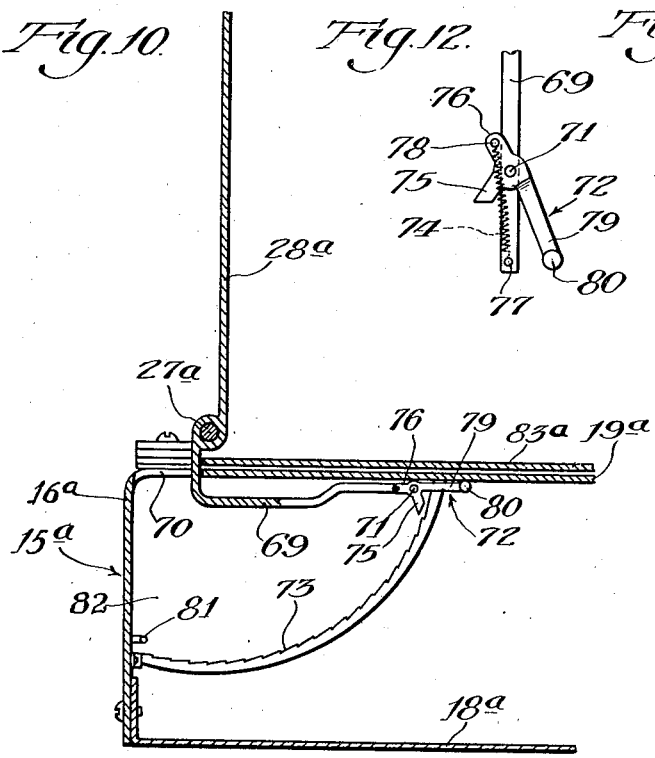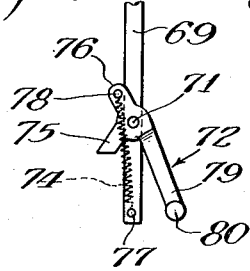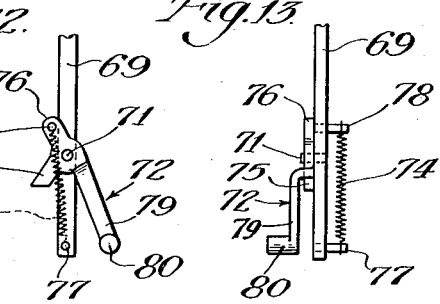

Patented Sept. 23, 1941

2,256,533

UNITED STATES PATENT OFFICE 2,256,533

MANIFOLDING DEVICE

James A. Taggart, Chicago, Ill., assignor, by mesne assignments, to The Tri-Graph Company, Chicago, Ill., a corporation of Illinois Application July 10, 1940, Serial No. 344,646

8 Claims. (Cl. 282—5)

This invention relates to a manifolding device, that is to say, to a device which may be used in retail stores and like places for making or keeping records of customers' accounts and payments.

In certain types of retail stores, and especially in stores selling on credit or doing an installment payment business, it is customary for the customer to be given a card on which his or her payments are recorded, this card being retained by the customer and produced as and when each payment is made. Likewise in business places of this character it is customary for the store or merchant to keep an office or ledger card on which the customer's payments are recorded as made and it is likewise common practice in such places to keep a daily receipts record or sheet on which the payments made are totaled at the end of each day.

At the present time there are available key-controlled bookkeeping machines for automatically making a record of payments on the customer's card, on the daily cash receipts record or sheet, and on the office ledger card, but these machines are relatively expensive and many merchants, especially the smaller ones, doing an installment or credit business are unable to afford the same. One result of this is that the bookkeeper in such places of business frequently make errors in posting customers' payments to the wrong account or accounts by reason of the fact that the bookkeeper has no way of making or posting the entry on the ledger card at the same time that the installment payment is made on the customer's card. Hence the bookkeeper frequently defers posting such payments until a later time, with the result that the customers' payments become credited to the wrong accounts.

Accordingly, an object of the present invention is to provide a novel and relatively inexpensive and manually operable or non-key-controlled manifolding device by means of which merchants doing an installment or credit business and unable to afford an expensive key-controlled or automatic bookkeeping machine of the character referred to above for this purpose may make simultaneously with each customer's payment a record on the customer's own card, on the corresponding office or ledger card, and on a daily cash receipts record or sheet which may be totaled by the bookkeeper or clerk at the end of each business day.

Another object of the invention is to provide in the manifolding device referred to above a novel construction for advancing the paper web or sheet, on which the daily cash receipts record is kept, after each customers' payment is entered thereon.

A further object of the invention is to construct the operating mechanism for the web-advancing mechanism, by which the paper sheet on which a record of the daily cash receipts is kept, in such a manner that the said web-advancing mechanism will be operated after each payment is entered on the daily cash receipts record sheet before another payment can be entered thereon, thus preventing any possibility of error by the bookkeeper in making two or more entries at the same point or on the same area or line of the daily cash receipts record sheet.

Another object of the invention is to provide a novel hinged member or shield which overlies the customer's card, the underlying daily cash receipts record or sheet, and the office or ledger card, in such a manner that said shield performs the novel dual function of acting as a shield to protect the said daily cash receipts sheet from being smeared by the carbon papers which are arranged on opposite sides thereof but also functions as a manual control for the web-advancing mechanism which is embodied in the new device for advancing the paper web or sheet on which the daily cash receipts record is kept.

A further object of the invention is to construct one form or embodiment thereof in such a manner that the aforesaid combination hinged shield and manual control member for the web-advancing device must be operated through its full cycle of upward movement, after the posting of each payment made by a customer, in order to effect operation of the web-advancing mechanism for the daily cash receipts record or sheet, before it can be lowered into its normal or lowered position.

Another object of the invention is to provide, in one form of the invention, a combination shield and web-advancing member which operates in such a manner, that it must be operated through a complete cycle of its upward movement, once an operation thereof has been instituted, so as to prevent the bookkeeper or clerk using the new manifolding device from making duplicate entries on the same line or area of the daily cash receipts record or total sheet.

It will be noted, in this connection, that in business places doing an installment or credit business and which do not have the automatic or key-controlled bookkeeping machines which are referred to herein, it is necessary for the clerk or bookkeeper to post an entry of each customer's payment to the ledger or ledger card after the payment or payments have been made and when a large number of such payments are made in a day this greatly increases the amount of time and labor required in keeping books or records in such places.

Accordingly, another object of the present invention is to provide a relatively simple and inexpensive time and labor saving device in the use of which the time and labor formerly required in posting customers' payments to ledger cards in business places not equipped with automatic or key-controlled bookkeeping machines is eliminated, thereby effecting a material saving and economy.

Other and further objects of the present invention wil be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a top plan view of a preferred embodiment of the new manifolding device;

Fig. 2 is a longitudinal sectional view of the same on line 2—2 in Fig. 1;

Fig. 3 is a view on line 3—3 in Fig. 1, partly in section and partly in side elevation, showing a portion of the web-advancing mechanism which is embodied in the new manifolding device;

Fig. 4 is a transverse sectional view on line 4—4 in Fig. 1;

Fig. 5 is a transverse sectional view on line 5—5 in Fig. 1;

Fig. 6 is a transverse sectional view similar to Fig. 5, but showing the combination shield and control member for the web-advancing mechanism for the daily cash receipts record sheet in raised position;

Fig. 7 is a vertical sectional view on line 7—7 in Fig. 2;

Fig. 8 is an end or edge elevational view showing the arrangement of the daily cash receipts sheet and the carbon papers or sheet which are arranged one at each side thereof;

Fig. 9 is a view, partly in section and partly in side elevation showing a modified form of the invention, that is to say, showing a device which may be added or attached to the form of the invention which is shown in Figs. 1 to 8, inclusive;

Fig. 10 is a view similar to Fig. 9 but showing the combination shield and control member for the web-advancing mechanism in raised position;

Fig. 11 is a fragmentary top plan view of a part of the device which is shown in Figs. 9 and 10;

Fig. 12 is a side elevational view of a trip mechanism which is embodied in the device which is shown in Figs. 9 and 10; and Fig. 13 is a detailed elevational view of the trip mechanism which is shown in Fig. 12.

A preferred embodiment of the new manifolding device is shown in Figs. 1 to 8, inclusive, of the drawings, and comprises a generally rectangular-shaped metal supporting frame or casing 15 which may be made in any suitable manner as, for example, by a die-forming operation, this supporting frame or casing including side walls 16 and 17, a bottom wall 18, and a top wall or supporting surface 19. Inasmuch as the manifolding device which forms the subject matter of the present invention is intended for use on desks, tables, and like places it is preferred to provide rubber or like supporting feet or pads 20 at the bottom thereof, these feet or pads 20 being attached to the bottom wall 18 in any suitable manner.

Suitably mounted in the supporting frame 15 adjacent one end of the latter, as at 21, and below the top wall 19 thereof, is a take-up roll 22 for a web 23 which includes a daily cash receipts sheet upon which entries are adapted to be made in the use of the new manifolding device, in a manner which will be described presently.

The web 23 is fed over the top wall or supporting surface 19 of the device, from the feed roll 24 which is journaled, as at 25, in the supporting frame 15, adjacent the opposite end thereof from the take-up roll 22, and below the top wall 19 thereof.

The rear end portion of the top wall 19 is extended rearwardly and downwardly (Fig. 2) to provide a guide 26 for the web 23 as the said web leaves the feed roll 24 and is directed over the top wall 19 to the take-up roll 22.

Hingedly connected to or mounted upon the top wall 19 of the supporting frame 15, above the latter, as at 27, is a combination shield and control member 28 for the web-advancing mechanism which is embodied in the new manifolding device, said web-advancing device being generally indicated at 29, (Fig. 3) and operating in a manner, presently to be described, to advance the daily cash receipts record sheet or web over the top wall 19.

A second shield member 30 is hingedly connected to or is mounted upon the top wall 19, as at 31 (Fig. 1) forwardly of the member 28 but, as will be explained presently, this shield member 30 in no way controls or affects the operation of the web-advancing mechanism 29 for the daily cash receipts record or sheet. This shield is partly supported by a member 63 (Fig. 2) which underlies the shield 30 and cooperates with the latter to provide a guide for the web 23.

As stated above, the web-advancing mechanism 29 for the daily cash receipts record web is under the control of and is operated by movement of the combination shield and control member 28 and the manner in which this is accomplished will now be described. To this end I form a vertically extending slot 32 in the top wall 19 and in this slot 32 I slidably mount a vertically extending metal bar or plunger 33. The lower end portion of this bar or plunger 33 is slidably guided in a slot 34 which is formed in a guide member 35 which is attached to the side wall 16, adjacent the bottom of said wall, and on the inner surface thereof (Fig. 6). The plunger or bar 33 has a portion 36 at its upper end which extends right-angularly inwardly from the body of said plunger or bar 33 and engageable with this right-angularly inwardly extending portion 36 of the plunger or bar 33 is an arm 37 which is attached to and is carried by the combination shield and control member 28 on the upper side of the latter (Figs. 1, 5 and 6).

A bell crank lever 38 is pivotally mounted, at 39, on the side wall 16, on the inner side of the latter, and one arm 40 of this bell crank lever 38 is pivotally connected, at 41, to the bar or plunger 33. The other arm 42 of the bell crank lever 38 is pivotally connected, as at 43, to a metal link 44, which, in turn, is pivotally connected, as at 45, to a slide bar 46 which is slidably mounted on the side wall 16 on the inner side of the latter, this slidable mounting of the slide bar 46 being effected by means of a headed screw 47 which is mouned in the side wall 16 and projects through a slot 48 which is formed in the slide bar 46.

One end portion of the slide bar 46 is formed to provide a pawl 49 (Figs. 2 and 3) and this pawl 49 is engageable with the teeth of a ratchet 50 which is mounted concentrically with and is carried by the take-up roll 22 for the paper web 23. The pawl 49 is normally urged into engagement with the teeth of the ratchet 50 by a coil spring 51. One end portion of this coil spring 51 is attached to the pawl 49 and the other end portion thereof being attached to a latch dog 52 which is pivotally mounted as at 53 in the side wall 16, this latch dog 52 having a portion 54 which rides the teeth of the ratchet 50 and prevents retroactive movement of the latter. A coil spring 55 (Fig. 2) urges the link 44 and the bell crank lever 38 into their normal positions, in which they are shown in full lines in Fig. 2, so as to keep the bar or plunger 33 in its normally raised position.

A guide member 56 for the bar or pawl 46—49 is adjustably mounted as at 57 on the side wall 16, on the inner side thereof, this being accomplished by forming an arcuate slot 58 in the said side wall 16 and providing a pin 59 on the guide member 56 which works in the slot 58, the guide member 56 having an end portion 60 which extends right-angularly from the body thereof and on which the bar 46 is slidably guided.

As shown in Fig. 8, the paper web 23 is preferably composed of three parts, namely, a sheet of plain white or suitably colored paper 23a, on which a daily cash receipts record may be kept, and a pair of carbon sheets 23b and 23c which are arranged on opposite sides of the sheet 23a, for reasons which will be explained presently.

A flat plate or shield 83 is fixedly mounted above the top wall 19 of the casing 15 in spaced relationship thereof (Figs. 5, 6, 7 and 10) for a reason which will be explained hereinafter.

The use of that form of the new manifolding device which is illustrated in Figs. 1 to 8, inclusive, and the construction of which has been described above, is as follows: When a customer calls at the place of business where the new manifolding device is in use to make a credit or installment payment on his or her account, the bookkeeper or clerk pulls the office or ledger card 61 for that particular customer out of the file, raises the combination shield and control member 28, and then places the office or ledger card 61 on the upper or supporting surface of the top wall 19, with all but the front end portion of the inner or top end portion of the ledger card 61 disposed below the shield or plate 83, in the position in which said office or ledger card 61 is shown in Fig. 1 and with the top space or identification data line 64 on the office card 61 in registration or alignment with guide marks which consist of a pair of lines 65 which are provided on the upper surface of the top wall 19 and extend transversely thereof (Fig. 1). When the shield 28 has been raised and the ledger card 61 properly positioned, the bookkeeper or clerk then places the customer's own card 62 over the web 23 with the top space or identification data line 66 on the customer's card in registration or alignment with the top space or line 64 on the office or ledger card and also in alignment or registration with the guide marks 65 on the top wall or supporting surface 19 of the frame 15.

The shield 28 is then lowered into the position in which it is shown in Fig. 1, whereupon the bookkeeper or clerk may write in the proper line 67 on the customer's own card 62 a record of the payment made by the customer on his or her account and in so doing a record of this payment is transferred by the upper carbon sheet 23c to the daily cash receipts sheet 23a, while at the same time a record of this payment is also made, by the lower carbon paper 23b, (Fig. 8), upon the office or ledger 61. It will be noted, in this connection, that the shield or plate 83 prevents the lower carbon sheet 23c from engaging the ledger card 61 except where the latter projects forwardly of the inner end of the plate 61 (Fig. 6) so that the ledger card 61 will not become smeared during the writing operation.

As the bar or plunger 33 is depressed, by the raising of the combination shield and control member 33, in the manner described above, it moves the bell crank lever 38 about the latter's pivot 39 (counterclockwise, from full to dotted line position, Fig. 2), and this movement of the bell crank lever 38 moves the link 44 and the slide bar 46 and pawl 49 from left to right, as seen in Fig. 2, and from full to dotted line position as seen in Fig. 3. During this movement of the slide bar 46 the pawl portion 49 thereof engages the teeth of the ratchet 50 and in so doing advances the take-up roll 21 for the web 23 (clockwise, Figs. 2 and 3) a predetermined circumferential distance, (clockwise, Fig. 2), after which the link 44 and slide bar-pawl 46—49 are returned to their initial positions by the resetting spring 55, retroactive movement of the ratchet 50 and the take-up roll 21 being prevented, after each web-advancing operation, by the latch dog 52.

It will thus be seen that after the clerk or bookkeeper using the new manifolding device makes an entry of a customer's payment, in the manner described above, the web 23 is advanced a distance (from bottom to top as seen in Fig. 1 or from left to right as seen in Fig. 2) corresponding to the width of one of the entry lines or spaces 67 and 68 in the customer's own card 62 and in the office or ledger card 61, respectively, or, in other words, a distance equal to the space between the guide lines or marks 65 which are provided on the upper surface of the top wall 19 (Fig. 1). Hence the clerk or bookkeeper is prevented from making a second or subsequent record or entry on the same portion of the daily cash receipts record sheet 23a, after having made one entry thereon, since the web 23 is advanced, by the raising of the combination shield and control member 28, after each entry-making operation, so as to present a clean portion of the daily cash receipts sheet 23a in registration with the guide lines or marks 65.

It will also be noted that the member 28, in addition to acting as a manual control for the web-advancing mechanism for the web 23, serves as a shield for the operator's hand during the entry making operation so as to prevent blurring of the carbon papers 23c and 23b upon the daily cash receipts sheet 23a or office ledger card 61, respectively.

The shield 30, while not entirely essential to the use of the new manifolding device, also helps to prevent smearing of the carbon papers 23c and 23b upon the daily cash receipts sheet 23a since the shield 30 normally overlies the web 23, The shield 30 may be raised, at its hinge 31, when necessary as, for example, when installing the combination carbon paper and cash receipts record sheet or web 23 upon the feed roll 24 and upon the take-up roll 22 and extending the same over the top wall 19.

It will be noted, therefore, that by means of the new manifolding device a clerk or bookkeeper in a place of business which does a credit or installment payment business, may make simultaneously a record of a customer's payment upon the customer's own or personal record card 62, upon the daily cash receipts record sheet 23a, and upon the office or ledger card 62 for that particular customer, and at the end of each business day the clerk or bookkeeper may take from the sheet 23a a total of the cash receipts or payments for the day.

It will also be noted that in the use of the new manifolding device the time and labor formerly required in posting customers' payments to ledger cards, in places doing an installment or credit business and not equipped with automatic or key-controlled bookkeeping machines, is eliminated, thereby effecting a material saving and economy.

It will likewise be observed that the new manifolding device has the additional advantage which resides in the fact that in the use of the same the clerk or bookkeeper is required to pull the customer's office or ledger card 61 each time the customer makes a payment on his or her account, thus assuring that the payment made by the customer will be correctly entered to the credit of his or her account on the proper office or ledger card 61 which frequently does not happen in places where the clerk or bookkeeper is not required to pull the office or ledger card and make a record of payment thereon simultaneously with the customer's payment and the entry of such payment on the customer's own or personal record card.

It will also be noted that in the use of the new manifolding device the web 23 travels over the upper surface of the stationary plate 83 which, being disposed above the ledger or like card, 61 (see Figs. 5 and 6), protects or prevents that portion of the ledger card 61 which is disposed below the plate 83 from being soiled by that portion of the lower carbon paper 23b which is disposed above the plate 83.

A modified form of the invention, or, more properly an attachment therefor, is shown in Figs. 9 to 13, inclusive. This form of the invention is substantially the same as that which is shown in Figs. 1 to 8, inclusive, and parts therein corresponding to similar parts which are embodied in the form of the invention shown in Figs. 1 to 8, inclusive, will be given the same reference numerals followed by the letter "a".

In the modified form of the invention which is shown in Figs. 9 to 13, inclusive, a means or device is provided for making it compulsory, upon the part of the clerk or bookkeeper employing the new manifolding device, to raise the combination shield and control member 28a, for the web-advancing mechanism for the web 23, to the full limit of its upper movement before it can be lowered to make a second or subsequent entry, thereby rendering it certain that the web-advancing mechanism for the web 23 will be operated after each entry-posting operation before a second or subsequent entry is made on the daily cash receipts record sheet 23a.

This device, which will be described presently, is provided because of the fact that the clerk or bookkeeper using that form of the new manifolding device which is illustrated in Figs. 1 to 8, inclusive, might occasionally fail to raise the combination shield and control member 28 far enough to engage the arm 27 thereof with the angled upper end portion 36 of the bar or plunger 33, or far enough to fully depress the latter, and thus fail to operate the web-advancing mechanism for the paper web 23, which would result in the next subsequent customer payment or entry being made on the same area or line of the daily cash receipts sheet 23a as the previous entry. In the normal or thoughtful operation of that form of the invention which is illustrated in Figs. 1 to 8, inclusive, this would not be likely to happen but in view of the fact that it might possibly happen due to inexperience or carelessness on the part of the clerk or bookkeeper using the new manifolding device, the attachment which is shown in Figs. 9 to 13, inclusive, is provided.

The device which is shown in Figs. 9 to 13, inclusive, is, in effect, an attachment which may be added to the form of the invention which is shown in Figs. 1 to 8, inclusive, if desired, or it may be omitted therefrom. It comprises a depending arm or extension 69 which is formed on the combination shield and control member 28a, this arm 69 projecting through and working in a slot 70 which is formed in the top wall 19a of the supporting frame 15a. Carried by and pivotally mounted on the arm 69, as at 71, is a member 72 which includes a relatively short arm 76 and a relatively long arm 79 which are arranged on opposite sides of the pivot or center 71 by means of which the member 72 is mounted on the arm 69; the arm 79 being provided with a right-angularly extending portion 80 at its outer end (Fig. 12) for reasons which will be explained presently. This member 72 also includes an arm 75 which provides a latch dog.

One end portion of the coil spring 74 is attached, as at 78, to the short arm 76 of the member 72 and the other end portion of the coil spring 74 is attached to a pin 77 which is attached to and projects from the arm 69 (Figs. 12 and 13). The latch dog 75 of the member 72 is adapted to ride the teeth of a ratchet 73 which is provided within the supporting frame or casing 15a upon or adjacent to the end wall 82 thereof. This ratchet 73, as shown in Fig. 10, ends some distance below the top wall 19a of the manifolding device, for a reason which will be explained presently.

In the use of the device which is shown in Figs. 9 to 13, inclusive, the arm 69 and the member 72 and its parts 75—76—79—80 are disposed in the position in which they are shown in Fig. 9 when the combination shield and control member 28a is in its lowered position, as in Fig. 9. As the combination shield and control member 28a is raised from the position in which it is shown in Fig. 9, into the position in which it is shown in Fig. 10, the latch dog or arm 75 of the member 72 rides up the teeth of the ratchet 73 and in so doing prevents retroactive or downward movement of the said combination shield and control member 28a. However, as and when the combination shield and control member 28a reaches the full or extreme upper limit of its upward stroke, the arm 80 of the member 72 engages the bottom surface of the top wall 19a of the casing 15a, thereby pivoting the member 72, at 71, (clockwise, as seen in Figs. 9 and 12) whereupon the spring 74, being thus carried past the center formed by the pivot 71, urges and holds the latch dog 75 out of engagement with the teeth of the ratchet 73; the parts then assuming the position in which they are shown in Fig. 10.

However, when the shield 28a is lowered, the latch arm or dog 75 of the member 72 rides downwardly with the arm 69, but out of engagement with the ratchet 73, until the shield 28a is fully lowered at which time the latch arm or dog 75 of the member 72 engages a trip 81 which is stationarily mounted on the side wall 16a of the supporting frame or casing 15a (Figs. 9 and 10). When the latch arm 75 engages the trip 81 the member 72 is pivoted, at 71, into the position in which it is shown in Fig. 9 and in which position it is held by the spring 74 with the latch arm or dog 75 thereof in engagement with the teeth of the ratchet 73, until the shield 28a is again raised when the foregoing cycle of movements is repeated.

Hence it will be seen that the attachment shown in Figs. 9 to 13, inclusive, makes it necessary for the clerk or bookkeeper using the new manifolding device to raise the combination shield and control member 28a to the full or extreme limit of its upward stroke, once upward movement of said member 28a has been initiated, thereby assuring that the web-advancing mechanism for the paper web 23, which is under the control of the member 28a, will be operated to advance the web 23 and the included daily cash receipts record sheet 23a and thus present a clean portion or area thereof in alignment or registration with the guide markers 65 on the upper surface of the top wall 19a of the casing or frame 15a, after each entry-making operation. As stated above, this prevents the clerk or bookkeeper using the new manifolding device from making two entries on the same area of the daily cash receipts record sheet 23a, as might happen in the use of that form of the invention which is shown in Figs. 1 to 8, inclusive, if the operator did not raise the combination shield and control member 28 and its arm 37 far enough to engage the angled upper end portion 36 of the bar or plunger 33, or did not depress the latter sufficiently to effect operation of the web-advancing mechanism and the daily cash receipts record sheet 23a advanced thereby. Hence it will be seen that the attachment which is shown in Figs. 9 to 13, inclusive, may well be used in conjunction with that form of the invention which is shown in Figs. 1 to 8, inclusive, although it is not indispensable.

While I have illustrated and described preferred forms of construction for carrying my invention into effect, these are capable of variation and modification, without departing from the spirit of the invention. I, therefore, do not wish to be limited to the precise details of construction set forth, but desire to avail myself of such variations and modifications as come within the scope of the appended claims.

I claim:

1. A manifolding device of the character described, including a supporting frame having a surface for supporting a movable inscription-copy-receiving web and a superposed carbon web and an inscription sheet thereon, a substantially flat plate-like member movably mounted upon said supporting frame for movement downwardly toward and upwardly away from the said supporting surface and adapted, when in lowered position, to overlie a portion of the said supporting surface, and serving as a hand rest for the writer and leaving a portion of said webs on the supporting surface extending beyond the plate member, and means under the control of said member and operable thereby for simultaneously moving the said inscription-copy-receiving web, and said carbon web a predetermined distance over the said supporting surface during each upward movement of said member.

2. The device defined in and by claim 1 wherein the web moving means includes a member carried by the supporting frame and having a portion thereof projecting above the supporting surface and engaged by the said movably mounted member when the latter is moved upwardly for effecting simultaneous movement of the said inscription-copy-receiving web and the carbon web.

3. The device defined in and by claim 1 wherein the web moving means includes a vertically movable plunger mounted in said supporting frame and having a portion thereof projecting above the said supporting surface and engaged by the said movably mounted member in each of the latter's upward movements for effecting simultaneous movement of the said inscription-copy-receiving web and the carbon web.

4. A manifolding device of the character described, including a supporting frame having a surface for supporting a movable inscription-copy-receiving web and a superposed carbon web and an inscription sheet thereon, a substantially flat plate-like member hingedly connected at one end to the said supporting frame at one side of the latter for movement downwardly toward and upwardly away from the said supporting surface and adapted, when in lowered position, to overlie a portion of the said supporting surface, and serving as a hand rest for the writer and leaving a portion of said webs on the supporting surface extending beyond the plate member, and vertically movable means under the control of said member and operable thereby for simultaneously moving the said inscription-copy-receiving web, and said carbon web a predetermined distance over the said supporting surface during each upward movement of said member.

5. A manifolding device of the character described, including a supporting frame having a surface for supporting a movable inscription-copy-receiving web and a superposed carbon web and an inscription sheet thereon, a substantially flat plate-like member hingedly connected at one end to the said supporting frame for movement downwardly toward and upwardly away from the said supporting surface and adapted, when in lowered position, to overlie a portion of the said supporting surface, and serving as a hand rest for the writer and leaving a portion of said webs on the supporting surface extending beyond the plate member, means under the control of said member and operable thereby for simultaneously moving the said inscription-copy-receiving web, and said carbon web a predetermined distance over the said supporting surface during each upward movement of said member, and a second substantially flat-plate-like member hingedly connected to said supporting frame in advance of and spaced from the first mentioned member.

6. A manifolding device of the character described, including a supporting frame having a surface for supporting a movable inscription-copy-receiving web and a superposed carbon web and an inscription sheet thereon, a substantially flat plate-like member movably mounted upon said supporting frame for movement downwardly toward and upwardly away from the said supporting surface and adapted, when in lowered position, to overlie a portion of the said supporting surface, and serving as a hand rest for the writer and leaving a portion of said webs on the supporting surface extending beyond the plate member, means under the control of said member and operable thereby for simultaneously moving the said inscription-copy-receiving web, and said carbon web a predetermined distance over the said supporting surface during each upward movement of said member, and means for preventing downward movement of said member, once upward movement thereof has been initiated, until the maximum limit of the upward movement of the said member has been attained.

7. A manifolding device of the character described, including a supporting frame having a surface for supporting a movable inscription-copy-receiving web and a superposed carbon web and an inscription sheet thereon, a substantially flat plate-like member hingedly connected at one end to the said supporting frame at one side of the latter for movement downwardly toward and upwardly away from the said supporting surface and adapted, when in lowered position, to overlie a portion of the said supporting surface, and serving as a hand rest for the writer and leaving a portion of said webs on the supporting surface extending beyond the plate member, and vertically movable means under the control of said member and operable thereby for simultaneously moving the said inscription-copy-receiving web, and said carbon web a predetermined distance over the said supporting surface during each upward movement of said member, and means for preventing downward movement of said member, once upward movement thereof has been initiated, until the maximum limit of the upward movement of the said member has been attained.

8. The device defined in and by claim 1 in which a portion of the said supporting surface is defined by a stationary plate carried by the said supporting frame and spaced slightly above the upper surface of the said supporting frame so that a ledger card or the like may be placed upon the said upper surface of the said supporting frame with a portion of said ledger card or the like disposed below the said stationary plate, and in which device the said stationary plate supports a second and lower carbon web which is adapted to make a carbon impression upon a portion of the said ledger card or the like, and in which device the said stationary plate prevents that portion of the said ledger card or the like which is disposed below the said stationary plate from being soiled by the said second and lower carbon web when the operator's hand is resting upon the said substantially flat plate-like member during the writing or manifolding operation.

JAMES A. TAGGART.